United States Patent Office 3,366,599
Patented Jan. 30, 1968

3,366,599
POLYACETALS STABILIZED WITH
STYRENATED PHENOLS
Claus Heuck, Hofheim, Taunus, and Günther Roos,
Frankfurt am Main, Germany, assignors to Farbwerke
Hoechst Aktiengesellschaft vormals Meister Lucius &
Brüning, Frankfurt am Main, Germany, a corporation
of Germany
No Drawing. Filed Sept. 25, 1963, Ser. No. 311,331
Claims priority, application Germany, Sept. 27, 1962,
F 37,897
2 Claims. (Cl. 260—45.9)

The present invention relates to stabilized polyacetals and a process for preparing them.

Polyacetals are polymerization products of aldehydes, in particular formaldehyde, that contain a plurality of structural units having the formula

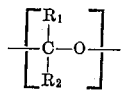

in which $R_1$ represents a hydrogen atom and $R_2$ represents a hydrogen atom or an alkyl group. Owing to the —C—O—C—O—C—acetal-oxygen bridge which is due to the molecular structure, polymers or copolymers of the aforesaid kind which are at least in part made up of structural units of the above formula are very sensitive to the action of atmospheric oxygen, especially at elevated temperatures or when exposed to light, and undergo a degradation whereby their mechanical properties, for example, their tensile strength, their elongation and above all their impact strength, are considerably imparied.

Several processes have been known for improving the stability of such polyacetals. These known processes are either based on a slight modification of the structure of the polyacetal molecules which is brought about by the stabilization of the terminal groups by the reaction of a polyacetal with an acid anhydride, an isocyanate or a similar compound. In processes of this kind the hydroxyl groups that are present in the polyacetals as terminal groups are esterified or etherified. Or, alternatively, the processes are based on a modification of the structure of the macromolecules obtained by the polymerization of aldehydes, by the incorporation of a formal, for example, a glycolic formal or a cyclic ether, as a second polymerization component.

However, the polyacetals which have been improved by one of the aforesaid methods are not yet stable enough to comply with the requirement they have to meet when used as plastic materials that are to be transformed into shaped articles.

For this reason a number of compounds have already been proposed as substances for imparting a good stabilizing effect against oxidative degradation of the polyacetals which is caused especially by the action of heat and light. As stabilizers of this kind have been known amines, phenols, aliphatic or aromatic sulfides or mercaptanes and compounds containing sulfur in a cyclic bond as is the case, for example, in trithiane or in the thiodiazoles.

We have now found that polyacetals and copolymers of aldehydes, in particular formaldehyde, and cyclic ethers, formals or cyclic acetals the terminal groups of which may be esterified or etherified, and which may contain known stabilizers, can be protected against the action of atmospheric oxygen, in particular under the simultaneous action of heat and/or light by adding to them an addition product of 1 to 2 mols of styrene or α-methyl styrene with 1 mol or an alkyl-substituted phenol as a stabilizer. The phenol may be substituted by 1 or 2 alkyl groups containing 1 to 9 carbon atoms. In general, the stabilizer or stabilizers is or are added in an amount of 0.1 to 5.0% by weight, preferably 0.3 to 2% by weight, calculated on the polymer. The formation of the stabilizers according to the invention takes place, for example, according to the following scheme:

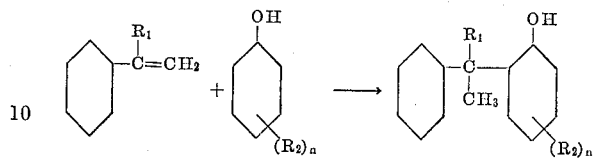

In these formulae, $R_1$ represents hydrogen or a methyl group, $R_2$ represents an alkyl group containing 1 to 9 carbon atoms, preferably the methyl, isopropyl, tert, butyl, octyl or nonyl group and $n$ stands for 1 or 2. In cases in which the addition product is prepared from 2 mols of styrene or α-methyl styrene and 1 mole of phenol the second molecule is added in the second o-position or in p-position with respect to the hydroxyl group, depending on the position of the alkyl radical. Compounds of the aforesaid constitution have an excellent stabilizing effect and besides they have very little tendency of causing a change of colour, even when specimens containing them are heated for a prolonged period at an elevated temperature.

By polyacetals are here understood known homopolymers of formaldehyde or trioxane and known copolymers whose recurring units consist essentially of (A) —O—CH$_2$— groups interspersed with (B) groups of the formula

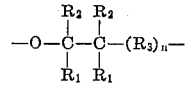

in which each $R_1$ and $R_2$ is a member selected from the group consisting of hydrogen and lower alkyl radicals and halogen-substituted lower alkyl radicals, each $R_3$ is a member selected from the group consisting of methylene, oxymethylene, lower alkyl and haloalkyl substituted methylene and lower alkyl and haloalkyl substituted oxymethylene radicals and $n$ is an integer from zero to three, each lower alkyl radical having 1 to 2 carbon atoms, said (A) units constituting 85% to 99.9% of the recurring units and said (B) units being incorporated during the step of copolymerization to produce said copolymer by the opening of the ring of a cyclic ether or a cyclic acetal having adjacent carbon atoms by the breaking of an oxygen-to-carbon linkage.

The efficiency of the stabilizers according to the invention can further be improved by using them in admixture with 0.01 to 10% by weight, preferably 0.05 to 5% by weight, calculated on the polymers, of known heat stabilizers, for example amides, polyamides, urea derivatives, hydrazine derivatives and amidines. The addition of dicyanodiamide has proved to be particularly suitable. The stabilizers according to the invention may also be used in admixture with further substances having a stabilizing effect.

The optimum stabilizing effect is obtained when the stabilizer which, as has already been mentioned, is in general added in a small quantity, is incorporated with the polyacetal as homogeneously as possible. For this reason the polyacetal which in most cases is used in the form of a powder is first mixed with the stabilizer or stabilizer system by means of an efficacious mixer and the resulting mixture is homogenized in a masticator or by extrusion in a continuously operating screw extruder. Instead of preparing a dry mixture of polyacetal and stabilizer system, the stabilizer or stabilizer system containing a stabilizer according to the invention and a known stabilizer may incorporated with the pulverulent polyacetal in the form of a solution in an inert organic solvent, for example, acetone or chloroform, or the solution may be applied to the polyacetal by spraying. It is then generally necessary to remove the solvent by a subsequent heat treatment which is suitably carried out in a current of nitrogen or in vacuo.

The following examples serve to illustrate the invention but they are not intended to limit it thereto. The parts and percentages indicated in the examples and the table are by weight and calculated on the amount of polyacetal used.

In the experiments described in the examples, the polyacetals to which various stabilizers had been added were compressed at 190° C. and under a pressure of 50 kilograms per square centimeter, which pressure was increased to 100 kilograms per square centimeter when the mass became cold, to form plates 0.5 mm. thick. The bilizing effect of the stabilizers or stabilizer systems, above all the change of color, was ascertained by the so-called brittle test, that is by tempering the test plates in a warming cabinet at 120° C. The resistance of the test specimens to the action of heat and to oxidation was determined by heating the plates for 45 minutes at 230° C. in a current of oxygen in an oil thermostat.

After the test specimens had become cold the loss of their weight in percent was determined. The dissociation constant Kd 230° C./$O_2$ was calculated from the loss of weight in percent at 230° C. in oxygen per minute.

The experiments were carried out with a polyacetal copolymer which had a solution viscosity at 140° C. within the range of 0.3 to 3, preferably 0.5 to 2.0, the said viscosity being determined with a solution of the polymer of 0.5% strength in butyrolactone.

The table given below indicates the results obtained by the experiments described in the examples and, for comparison purposes, the corresponding values which were obtained with unstabilized polyoxymethylene.

EXAMPLES 1 part of a condensation product of 1 mol of p-cresol and 2 mols of styrene which was dissolved in 50 parts of acetone was added, while stirring, to 100 aprts of a polyacetal which had been prepared by polymerizing 98 parts of trioxane and 2 parts of ethylene oxide according to the process described in Belgian Patents 591,716 and 610,391.

The acetone was removed, while stirring, in a current of nitrogen having a temperature of 80° C. and the product which had been freed from acetone was kept for 2 hours at 70° C. in a vacuum drying cabinet.

In order to examine the resistance to ageing pressed plates 0.5 mm. thick were prepared from the stabilized copolymer and stored at 120° C. in a warming cabinet. The time after which the pressed plates were changed to such an extent that they could no longer be bent without breaking was determined.

For the purpose of determining the resistance to the action of heat and to oxidation the stabilized copolymer was measured after 30 minutes at 230° C. under oxygen. The loss of weight was determined in percent or, in the case of the dissociation constant, in percent per minute. The change of color of the stabilizer copolymer was determined before the tempering and after the tempering for 20 days at 120° C.

The results of 5 more experiments are indicated in the following table. For comparison purposes a copolymer which had not been stabilized was examined and the results are shown in the table under number 1.

TABLE

| Experiment No. | Stabilizer | Concentration of stabilizer in percent | Stability to heat and oxidation at 230° C. under oxygen— | | Embrittlement or period, in days, after which a plate 5 mm. thick becomes brittle at 120° C. in a warming cabinet | Colour of the plate before and after the tempering in a warming cabinet at 120° C. for 20 days | |
|---|---|---|---|---|---|---|---|
| | | | Loss of weight in percent after 30 days | Kd 230° C./$O_2$: loss of weight in percent per minute | | Before | After |
| 1 | | | 48 | 1.6 | 2 to 5 | White | |
| | Condensation product of 1 mol of p-cresol and 2 mols of styrene | 1.0 | 23 | 0.77 | 25 | White | White. |
| 2 | Dicyanodiamide | 0.2 | 10 | 0.35 | 90 | White | White. |
| | Condensation product of 1 mol of p-cresol and 2 mols of styrene | 1.0 | | | | | |
| | Condensation product of 1 mol of m-cresol and 2 mols of styrene | 1.0 | 27 | 0.90 | 18 | White | |
| 3 | Dicyanodiamide | 0.2 | 9.5 | 0.32 | 90 | White | White. |
| | Condensation product of 1 mol of m-cresol and 2 mols of stryene | 1.0 | | | | | |
| | Dicyanodiamide | 0.2 | 10.2 | 0.34 | 90 | White | White. |
| | Condensation product of 1 mol of p-cresol and 1 mol of styrene | 1.0 | | | | | |
| 4 | Dicyanodiamide | 0.2 | 8.6 | 0.29 | 90 | White | White. |
| | Condensation product of 1 mol of o-cresol and 1 mol of styrene | 1.0 | | | | | |
| 5 | Dicyanodiamide | 0.2 | 9.3 | 0.31 | 90 | White | White. |
| | Condensation product of 1 mol of p-nonylphenol and 2 mols of styrene | 1.0 | | | | | |
| 6 | Dicyanodiamide | 0.2 | 6.3 | 0.22 | 80 | White | Slight grey tint. |
| | Condensation product of 1 mol of p-tert. butylphenol and 2 mols of styrene | 1.0 | | | | | |

We claim:
1. A composition comprising a polyacetal selected from the group consisting of homopolymers of formaldehyde or trioxane and copolymers whose recurring units consist essentially of (A) —O—$CH_2$— units interspersed with (B) units of the formula

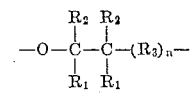

in which $R_1$ and $R_2$ are hydrogen, methyl, ethyl, halomethyl or haloethyl, $R_3$ is methylene, oxymethylene, methyl or ethyl-substituted methylene, halomethyl or haloethyl-substituted methylene, methyl or ethyl-substituted oxymethylene, halomethyl or haloethyl-substituted oxymethylene, $n$ is an integer from zero to three, and the (A) units constituting 85% to 99.9% of the recurring units, and, as stabilizer, 0.1 to 5% by weight, calculated on the polyacetal, of at least one addition product of 1 to 2 mols of a member selected from the group consisting of styrene and α-methyl styrene and 1 mol of an alkyl-substituted phenol.

2. A composition as claimed in claim 1, which in addition to the polyacetal and at least one adddition product of 1 to 2 mols of a member selected from the group consiting of styrene, α-methyl styrene with 1 mol of an alkyl-substituted phenol contains dicyandiamide in an amount from 0.01 to 10% by weight on basis of the polyacetal.

References Cited

UNITED STATES PATENTS

| | | | |
|---|---|---|---|
| 2,376,354 | 5/1945 | Gresham | 260—45.9 |
| 2,670,340 | 2/1954 | Kehe | 260—45.95 |
| 3,225,005 | 12/1965 | Asmus et al. | 260—45.95 |
| 3,256,246 | 6/1966 | Gutweiler | 260—45.9 |

FOREIGN PATENTS 569,384   5/1945   Great Britain.

DONALD E. CZAJA, *Primary Examiner.*
LEON J. BERCOVITZ, *Examiner.*
H. E. TAYLOR, JR., *Assistant Examiner.*